3,059,020
SUBSTITUTED CYCLOPROPYLAMINES AND
CYCLOPROPYLCARBAMATES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed Sept. 30, 1960, Ser. No. 59,473
10 Claims. (Cl. 260—468)

This invention relates to novel substituted cyclopropylamines having valuable therapeutic activity. These compounds alter or modify the central nervous system and are useful as ataractic, antidepressant and hypotensive agents.

More specifically, the novel substituted cyclopropylamines of this invention are aliphatic acyclic and cyclic substituted cyclopropylamines represented by the following structural formula:

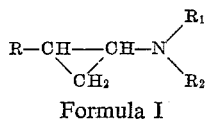

Formula I when:
R represents lower alkyl, straight or branched, of from 5 to 8 carbon atoms; or lower cycloalkyl of from 5 to 7 carbon atoms;
$R_1$ represents hydrogen, methyl, carbobenzoxy, carbethoxy or formyl; and $R_2$ represents hydrogen or methyl.

Advantageous compounds of this invention are represented by the following structural formula:

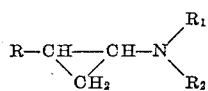

when:
R represents lower alkyl of from 5 to 8 carbon atoms or cyclohexyl;
$R_1$ represesnts hydrogen, methyl, carbobenzoxy or formyl; and $R_2$ represents hydrogen or methyl.

Particularly preferred compounds of this invention are 2-cyclohexylcyclopropylamine and 2-n-amylcyclopropylamine.

This invention also includes acid addition salts of the above defined bases formed with nontoxic pharmaceutically acceptable organic and inorganic acids. Such salts are easily prepared by methods known to the art. The base is reacted with either the calculated amount or organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic methanesulfonic, ethanedisulfonic, cyclohexyl sulfamic, acetic, propionic, tartaric, salicyclic, citric, gluconic, lactic, malic, mandelic, cinnamic, citroconic, aspartic, stearic, palmitic, itaconic, glycolic, p-aminobenzoic, glutamic, benzene sulfonic and theohpylline acetic acids as well as with the 8-halotheophyllines, for example 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The compounds of this invention may be present as cis-trans isomers due to the geometrical arrangement of the 2-substituent and the amino moiety with respect to the cyclopropane ring and further as d, l optical isomers. Unless otherwise specified in the specification and the accompanying claims, it is intended to include all isomers, particularly the separated cis or trans isomers and the resolved d- or l- cis or d- and l- trans isomers, as well as the cis-trans mixtures of these isomers.

The novel substituted cyclopropylamines of this invention are prepared according to the following synthetic scheme:

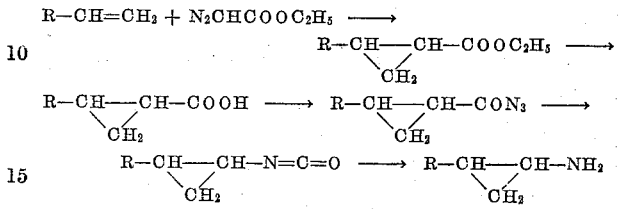

The appropriate vinyl substituted starting material which is known or prepared by methods known to the art, for example by pyrolysis of a substituted ethyl acetate ester, is condensed with ethyl diazoacetate to give a mixture of the cis-trans isomeric ethyl substituted-cyclopropanecarboxylates. These esters are saponified by refluxing with an aqueous alcoholic solution of an alkali metal hydroxide such as potassium or sodium hydroxide to give the corresponding cyclopropanecarboxylic acids.

The separated cis and trans substituted cyclopropanecarboxylic acids are obtained either by fractional distillation under reduced pressure of the ethyl carboxylate mixture followed by saponification of the separated esters or by fractional recrystallization of the free carboxylic acid mixture.

The cis-trans mixture of substituted cyclopropane carboxylic acids or the separated trans acid is further treated as follows. The acid is converted to the acid chloride by means of thionyl chloride or phosphorus pentachloride and the acid chloride is converted to the azide by heating to reflux in for example a toluene solution with sodium azide. The azide is then subjected to the general reaction conditions employed in the Curtius rearrangement, namely refluxing in an unreactive organic solvent, for example toluene, for several hours to yield the isocyanate. This latter compound is refluxed in a concentrated hydrochloric acid solution, made basic and extracted with ether to give the desired substituted cyclopropylamine free base.

The separated cis substituted cyclopropanecarboxylic acid is converted to the corresponding cyclopropylamine in an analogous manner. However, the intermediate acid azide is obtained by esterifying the cis acid with diazomethane in an ethereal solution, refluxing the methyl ester with hydrazine hydrate solution in ethanol and diazotizing the hydrazide with hydrochloric acid and sodium nitrite to the azide. The rearrangement of the azide is carried out as above in the presence of methanol to convert after refluxing for several hours the intermediate isocyanate to the methyl urethan which is subsequently hydrolyzed by refluxing with a saturated methanolic solution of barium hydroxide octahydrate to give the cyclopropylamine.

Alternatively, the intermediate trans acid azide is prepared from the trans acid via the hydrazide as described in the above sequence for the cis acid azide.

The compounds of Formula I above where the amino moiety is substituted by methyl, carbobenzoxy, carbethoxy or formyl are prepared readily from the corresponding primary amines. The carbobenzoxy and carbethoxy derivatives are prepared from the primary amine and benzyl chloroformate and ethyl chloroformate, respectively, at 0° C. in the presence of sodium hydroxide. The formyl derivatives are prepared from the primary amine and ethyl formate by refluxing for from 12 to 24 hours.

The N-monomethyl derivatives are prepared from the corresponding N-formyl compound by reacting with sodium amide or a suspension of sodium hydroxide or hydride in mineral oil to give the sodio derivative which is alkylated with methyl iodide to give the N-formyl-N-methylamine. The compound is then hydrolyzed in hydrochloric acid solution to give the N-monomethylamine. The dimethylamino derivatives are obtained by methylation of the primary amine with a mixture of aqueous formaldehyde and formic acid.

The N-monomethyl derivatives are alternatively prepared by other methods. Thus, the primary amine is refluxed with benzaldehyde in absolute ethanol, the formed benzolamine is heated with methyl iodide in a sealed container at from 100° C. to 150° C. and the latter reaction product is refluxed in ethanol for several hours.

The foregoing is a general description of the main synthetic routes in the preparation of the substituted cyclopropylamines of this invention. It will be readily apparent to one skilled in the art that variations of these procedures are possible. Of particular advantage as preparative procedures are the methods thoroughly discussed above, namely, conversion of substituted cyclopropanecarboxylic acids to the intermediate acid azides and subsequent rearrangement of the azides to the substituted cyclopropylamines.

The following examples are not limiting but are illustrative of compounds of this invention and the procedures for their preparation and will serve to make fully apparent all of the compounds embraced by the general Formula I above and the preparation thereof respectively.

Example 1

A portion of a cold mixture of 37.4 g. of vinyl cyclohexane and 42.6 g. of ethyl diazoacetate is stirred and heated in an oil bath until the internal temperature reaches 160° C. The remainder of the mixture is added dropwise so as to maintain a brisk evolution of nitrogen. When the addition is complete the heating is continued for four hours, keeping the internal temperature at 150–160° C. The reaction mixture is fractionated through a 6″ Vigreux column to give ethyl 2-cyclohexyl-cyclopropanecarboxylate, B.P. 69–120° C./0.4–0.7 mm.

A mixture of 30.0 g. of ethyl 2-cyclohexylcyclopropanecarboxylate in 175 ml. of ethanol and 18.4 g. of sodium hydroxide dissolved in 25 ml. of water is refluxed for eight and one-half hours. The reaction mixture is concentrated in vacuo and the residue is dissolved in water. The aqueous solution is extracted with ether and then acidified with concentrated hydrochloric acid. The acidic solution is extracted with ether and the dried ether extract evaporated to give a yellow oil, 2-cyclohexylcyclopropanecarboxylic acid.

A mixture of 23.3 g. of 2-cyclohexylcyclopropanecarboxylic acid and 66 ml. of thionyl chloride is allowed to stand for 18–24 hours at room temperature. The excess thionyl chloride is removed in vacuo and the residue is azeotroped twice with benzene. The residue is distilled through a short Vigreux column to give a yellow oil, 2-cyclohexylcyclopropanecarbonyl chloride, B.P. 85–89° C./0.4–0.6 mm.

A solution of 18.7 g. of 2-cyclohexylcyclopropanecarbonyl chloride in 300 ml. of acetone is stirred and cooled in an ice-bath. To this solution is added dropwise a solution of 13.0 g. of sodium azide in 45 ml. of water, maintaining the temperature at 10–13° C. After addition is complete the mixture is stirred for 30 minutes in the cold and then poured into 1 l. of ice-water. The aqueous mixture is extracted with ether and the dried extract evaporated. The residual oil is treated with 100 ml. of dry toluene and the solution is cautiously heated on the steam bath until a rapid bubbling is observed on the surface. When the bubbling subsides, the mixture is heated for one hour on the steam bath. The toluene is removed in vacuo to give the residual oily 2-cyclohexylcyclopropane isocyanate.

A mixture of 15.5 g. of 2-cyclohexylcyclopropane isocyanate and 220 ml. of concentrated hydrochloric acid is stirred and warmed cautiously. After the initial foaming subsides the mixture is stirred and refluxed for 12 hours. The reaction mixture is then concentrated in vacuo and the residue dissolved in water. The solution is extracted with ether, the aqueous layer is made basic and then extracted with ether. The dried ether extract is evaporated and a portion of the residue of 2-cyclohexylcyclopropylamine is dissolved in a small amount of ethyl acetate. The addition of an ethyl acetate solution of maleic acid gives 2-cyclohexylcyclopropylamine maleate, M.P. 120–122° C.

Example 2

A mixture of 9.8 g. of 1-heptene and 12.6 g. of ethyl diazoacetate is stirred and heated at 150–160° C. for four hours. The reaction mixture is then fractionated through a Vigreux column to give ethyl 2-n-amylcyclopropanecarboxylate.

A solution of 18.4 g. of ethyl 2-n-amylcyclopropanecarboxylate in 100 ml. of ethanol is treated with 5.2 g. of sodium hydroxide dissolved in 10 ml. of water and the mixture is refluxed for eight hours. The reaction mixture is concentrated in vacuo and the residue is dissolved in water. The aqueous solution is extracted with ether and then acidified with concentrated hydrochloric acid. The acidic solution is extracted with ether and the dried ether extract evaporated to give 2-n-amylcyclopropanecarboxylic acid (cis-trans mixture).

A mixture of 10.9 g. of 2-n-amylcyclopropanecarboxylic acid and 33 ml. of thionyl chloride is allowed to stand at room temperature for 20 hours. The excess thionyl chloride is removed and the residue azeotroped with benzene. The residue is vacuum distilled to give 2-n-amylcyclopropanecarbonyl chloride.

To a stirred and cooled solution of 17.4 g. of 2-n-amylcyclopropane carbonyl chloride in 300 ml. of acetone is added dropwise a solution of 13.0 g. of sodium azide in 45 ml. of water. After the addition is complete, the mixture is stirred for 30 minutes in the cold (10–13° C.) and then poured into ice-water. The aqueous mixture is extracted with ether and the dried extract is evaporated. The residue is dissolved in 100 ml. of toluene and the solution heated on the steam bath for one hour. Removal of the toluene leaves the residual 2-n-amylcyclopropane isocyanate.

A mixture of 15.3 g. of the isocyanate and 200 ml. of concentrated hydrochloric acid is stirred and refluxed for 12 hours. The reaction mixture is worked up as in Example 1 to give after evaporation of the ether extract 2-n-amylcyclopropylamine. Treating the free base with cyclohexyl sulfamic acid gives the corresponding cyclohexyl sulfamate salt.

Similarly, 10.9 g. of trans-2-n-amylcyclopropanecarboxylic acid separated from the above carboxylic acid cis-trans mixture is treated in the same reaction sequence to give trans-2-n-amylcyclopropylamine.

Example 3

A mixture of 10.0 g. of 2-methylcyclopropane-carboxylic acid and 40 ml. of thionyl chloride is allowed to stand for 24 hours at room temperature. The excess thionyl chloride is removed to give 2-methylcyclopropane-carbonyl chloride. The latter compound (9.5 g.) is dissolved in 150 ml. of acetone, cooled to 10° C. and treated with a solution of 10.4 g. of sodium azide in 30 ml. of water. After the addition is complete the mixture is treated as described in Example 1 with ice-water and extracted with ether to give the intermediate azide. A solution of the azide in 100 ml. of dry toluene is heated on the steam bath for 1–2 hours to give upon removal of the solvent, the 2-methlycyclopropane isocyanate.

The isocyanate thus prepared (9.7 g.) is then hydrolyzed by refluxing in 200 ml. of concentrated hydrochloric acid for 12 hours. The reaction mixture is concentrated in vacuo and the residue recrystallized from ethanol-ether to give 2-methylcyclopropylamine hydrochloride.

Similarly by employing 12.8 g. of 2-isopropylcyclopropanecarboxylic acid in the above reaction sequence there is obtained 2-isopropylcyclopropylamine hydrochloride.

The corresponding free bases are obtained by dissolving the hydrochloride salt in water, making the solution basic, extracting with ether and evaporating the dried ether extract to give the oily residue of free base.

*Example 4*

A mixture of 42.1 g. of 1-decene and 38.8 g. of ethyl diazoacetate is stirred and heated at 160° C. for five hours. The product, ethyl 2-n-octylcyclopropanecarboxylate, is obtained from the reaction mixture by distillation under reduced pressure. This ester (22.6 g.) is dissolved in 150 ml. of ethanol and refluxed for 10 hours with a solution of 12.0 g. of sodium hydroxide in 20 ml. of water. The reaction mixture is worked up as described in Example 1 to give 2-n-octylcyclopropanecarboxylic acid.

A mixture of 9.9 g. of 2-n-octylcyclopropanecarboxylic acid and 25 ml. of thionyl chloride is allowed to stand for 24 hours at room temperature. The excess thionyl chloride is removed in vacuo and the residue worked up as in Example 1 to yield 2-n-octylcyclopropanecarbonyl chloride. This chloride (21.7 g.) dissolved in 400 ml. of acetone is stirred and cooled as a solution of 13.0 g. of sodium azide in 50 ml. of water is added. The reaction mixture is poured into ice-water and the azide formed is extracted into ether. The isolated azide is heated in 100 ml. of toluene for one hour on the steam bath to give 2-n-octylcyclopropane isocyanate. This isocyanate (10 g.) is refluxed in 100 ml. of concentrated hydrochloric acid for 12 hours. Working up the reaction mixture as in Example 1 yields 2-n-octylcyclopropylamine. Treatment of the free base in absolute ether with anhydrous hydrogen bromide gas yields the corresponding hydrobromide salt.

*Example 5*

A solution of 11.4 g. of cyclopentaneethanol in 75 ml. of acetic anhydride is refluxed for two hours. The excess anhydride is removed under reduced pressure, the residue is treated with water and then extracted with ether. The ether extract is washed with a saturated saline solution, dried and evaporated in vacuo to give cyclopentaneethanol acetate.

A cylindrical column packed with glass helices is placed in a vertical position and heated to 460° C. while a slow stream of nitrogen is introduced. Cyclopentaneethanol acetate (15.6 g.) is slowly dropped through the column, maintaining the temperature. The vapors are collected in a cooled flask equipped with an acetone-Dry Ice condenser. Upon completion of the ethanol acetate addition, the column is flushed with 5 ml. of anhydrous benzene. The total collected product is diluted with 200 ml. of water and extracted with ether. The ether extract is washed with 5% sodium carbonate solution, dried and evaporated. A small amount of 4-t-butylcatechol is added to the residue and vacuum distillation gives vinyl cyclopentane.

Following the reaction procedures of Example 1, a mixture of 14.4 g. of vinyl cyclopentane and 18.2 g. of ethyl diazoacetate is heated at 140–150° C. for four hours. Distillation of the reaction mixture gives ethyl 2-cyclopentlycyclopropanecarboxylate which is hydrolyzed by refluxing in aqueous-ethanolic sodium hydroxide solution to give 2-cyclopentylcyclopropanecarboxylic acid. The cis-trans mixture of this acid is separated into the individual cis and trans isomers by fractional vacuum distillation.

An ethereal solution of diazomethane is added in portions to a solution of 7.5 g. of cis-2-cyclopentylcyclopropanecarboxylic acid in 100 ml. of absolute ether, until a yellow color persists. After standing at room temperature for 24 hours, the excess diazomethane is decomposed by addition of etereal hydrogen chloride. The dried ethereal solution is concentrated in vacuo to yield ci-methyl 2-cyclopentylcyclopropanecarboxylate.

To a solution of 8.0 g. of the above methyl ester in 20 ml. of absolute ethanol, is added 100 ml. of 100% hydrazine hydrate and the mixture refluxed for five hours. After standing for 18 hours at room temperature, the solution is concentrated in vacuo to give the residual cis-2-cyclopentylcyclopropanecarboxylic acid hydrazide.

The above hydrazide (7.0 g.) is dissolved in 175 ml. of 5% hydrochloric acid and a solution of 3.5 g. of sodium nitrite in 40 ml. of water is added slowly, with the temperature maintained at 0° C. The cooled solution is extracted with toluene and the combined extracts dried and concentrated in vacuo. Absolute methanol (250 ml.) is added to the toluene solution and the solution refluxed for five hours. The solvents are removed in vacuo to give the residual cis-2-cyclopentylcyclopropylmethyl urethan.

The above methyl urethan (8.0 g.) and 600 ml. of a saturated methanolic solution of barium hydroxide octahydrate is refluxed for 36 hours. The mixture is cooled to 0° C., filtered and the filtrate concentrated to dryness in vacuo to give the oily residual primary amine, cis-2-cyclopentylcyclopropylamine.

*Example 6*

A 40% aqueous solution of formaldehyde (5.1 g.) is added to a cooled solution of 2.8 g. of 2-cyclohexylcyclopropylamine (prepared as in Example 1) in 6.6 g. of 90% formic acid, and the mixture refluxed for 18 hours. The cooled reaction mixture is treated with 2.7 ml. of concentrated hydrochloric acid and the solution evaporated in vacuo. The residue is made alkaline with 50% potassium hydroxide solution and the solution extracted with ether. The dried ether extracts are evaporated to give the residual 2-cyclohexylcyclopropyldimethylamine.

The free base dissolved in ethyl acetate is added to a solution of mandelic acid in ethanol. Concentration of the resulting solution and cooling yields the crystalline 2-cyclohexlycyclopropyldimethylamine mandelate.

*Example 7*

A stirred mixture of 12.0 g. of sodium hydroxide, 41.7 g. of 2-cyclohexylcyclopropylamine (prepared as in Example 1) and 50 ml. of water is cooled to 0° C. and 32.5 g. of ethyl chloroformate is added dropwise at a rate so that the temperature does not exceed 20° C. When the addition is complete, the mixture is stirred for 30 minutes at 0° C. The reaction mixture is extracted with ether and the dried extract is concentrated to give the residual N-carbethoxy-2-cyclohexylcyclopropylamine.

*Example 8*

A stirred mixture of 12.0 g. of sodium hydroxide, 38.4 g. of 2-n-amylcyclopropylamine and 50 ml. of water is cooled to 0° C. and 51.2 g. of benzyl chloroformate is added dropwise, maintaining the temperature below 20° C. After the addition is complete, stirring is continued for 30 minutes at 0° C. The reaction mixture is then extracted with ether and the dried extract concentrated to give N-carbobenzoxy-2-n-amylcyclopropylamine.

*Example 9*

A solution of 12.8 g. of 2-n-amylcyclopropylamine and 100 ml. of ethyl formate is refluxed for 17 hours. The excess ethyl formate is evaporated in vacuo to leave the residual N-formyl-2-n-amylcyclopropylamine.

*Example 10*

To a stirred solution of 14.6 g. of N-formyl-2-n-amylcyclopropylamine (prepared as in Example 9) in 125 ml. of diethyleneglycol dimethyl ether is added 5.2 g. of a 54.5% suspension of sodium hydride in mineral oil.

The mixture is refluxed for two hours, cooled and an additional 5.2 g. of sodium hydride suspension is added. Refluxing is continued for two hours, the mixture is cooled and 67 ml. of methyl iodide is added. The mixture is allowed to stand for 16 hours at room temperature and then refluxed for eight hours under an acetone-Dry Ice condenser. After standing an additional 72 hours at room temperature, 20 ml. of methyl iodide is added and the mixture refluxed for four hours. The reaction mixture is filtered, the filtrate concentrated to ca. 75 ml. and poured into 1 l. of ice water, and the separated oil is extracted with methylene chloride. The dried extract is evaporated and distilled in vacuo to yield N-formyl-N-methyl-2-n-amylcyclopropylamine.

A mixture of 7.5 g. of N-formyl-N-methyl-2-n-amyl-cyclopropylamine and 100 ml. of 37% hydrochloric acid is refluxed and stirred for 20 hours. The reaction mixture is extracted with ether and the aqueous portion is concentrated in vacuo. The residue is dissolved in 200 ml. of water and the solution extracted with ether. The aqueous layer is made strongly alkaline with 40% sodium hydroxide solution and the separated oil is extracted with ether. The dried extract is evaporated in vacuo to give 2-n-amyl-cyclopropylmethylamine.

What is claimed is:

1. A chemical compound selected from the group consisting of a free base and its nontoxic pharmaceutically acceptable acid addition salts, said free base having the formula:

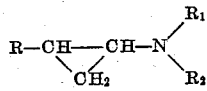

in which R is a member selected from the group consisting of a lower alkyl having from 5 to 8 carbon atoms and lower cycloalkyl having from 5 to 7 carbon atoms; $R_1$ is a member selected from the group consisting of hydrogen, methyl, carbobenzoxy, carbethoxy and formyl; and $R_2$ is a member selected from the group consisting of hydrogen and methyl.

2. A chemical compound of the formula:

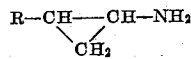

in which R is lower alkyl of 5 to 8 carbon atoms.

3. A chemical compound of the formula:

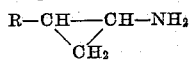

in which R is lower cycloalkyl of 5 to 7 carbon atoms.

4. A chemical compound of the formula:

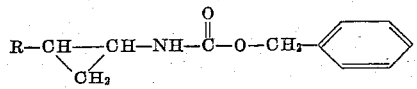

in which R is lower alkyl of 5 to 8 carbon atoms.

5. The chemical compound of the formula:

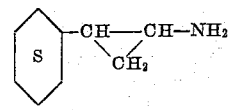

6. The chemical compound of the formula:

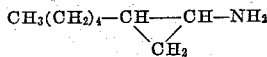

7. Trans-2-n-amylcyclopropylamine.

8. The chemical compound of the formula:

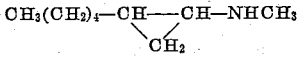

9. The chemical compound of the formula:

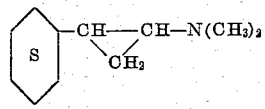

10. The chemical compound of the formula:

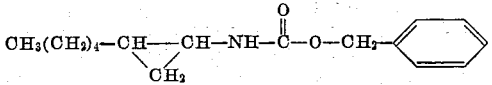

References Cited in the file of this patent

UNITED STATES PATENTS 2,784,226   Brown _____ Mar. 5, 1957

OTHER REFERENCES

Skrobal: Chem. Abst., vol. 31, page 7758 (1937).
Emmons: J. Am. Chem. Soc., vol. 79, page 6524 (1957).